United States Patent
Strandell et al.

(10) Patent No.: US 7,966,306 B2
(45) Date of Patent: Jun. 21, 2011

(54) METHOD, SYSTEM, AND APPARATUS FOR LOCATION-AWARE SEARCH

(75) Inventors: Toni Strandell, Helsinki (FI); Ari Aarnio, Espoo (FI); Carlos Quiroz Castro, Helsinki (FI)

(73) Assignee: Nokia Corporation, Espoo (FI)

( * ) Notice: Subject to any disclaimer, the term of this patent is extended or adjusted under 35 U.S.C. 154(b) by 561 days.

(21) Appl. No.: 12/072,937

(22) Filed: Feb. 29, 2008

(65) Prior Publication Data
US 2009/0222438 A1 Sep. 3, 2009

(51) Int. Cl.
*G06F 17/30* (2006.01)

(52) U.S. Cl. ........ 707/706; 707/707; 707/759; 707/771; 701/26; 701/207; 701/210

(58) Field of Classification Search .............. 707/3, 706, 707/707, 759, 771; 725/105; 701/26, 207, 701/210
See application file for complete search history.

(56) References Cited

U.S. PATENT DOCUMENTS

| | | | |
|---|---|---|---|
| 6,442,544 B1* | 8/2002 | Kohli | 1/1 |
| 6,477,461 B2* | 11/2002 | Tanaka et al. | 701/209 |
| 7,428,522 B1* | 9/2008 | Raghunathan | 1/1 |
| 7,565,157 B1* | 7/2009 | Ortega et al. | 455/456.2 |
| 7,599,795 B1* | 10/2009 | Blumberg et al. | 701/213 |
| 7,680,859 B2* | 3/2010 | Schiller | 707/738 |
| 2003/0135582 A1 | 7/2003 | Allen et al. | |
| 2005/0071361 A1* | 3/2005 | Hettish et al. | 707/102 |
| 2005/0080786 A1* | 4/2005 | Fish et al. | 707/10 |
| 2005/0160107 A1* | 7/2005 | Liang | 707/100 |
| 2005/0223030 A1 | 10/2005 | Morris et al. | |
| 2005/0262049 A1* | 11/2005 | Somppi | 707/3 |
| 2006/0148488 A1* | 7/2006 | Syrbe | 455/456.1 |
| 2006/0218114 A1* | 9/2006 | Weare et al. | 707/1 |
| 2007/0038616 A1* | 2/2007 | Guha | 707/4 |
| 2007/0061302 A1 | 3/2007 | Ramer et al. | |
| 2007/0130128 A1* | 6/2007 | Garg et al. | 707/3 |
| 2007/0162942 A1* | 7/2007 | Hamynen et al. | 725/105 |
| 2007/0218891 A1* | 9/2007 | Cox | 455/422.1 |
| 2007/0294242 A1* | 12/2007 | Watanabe et al. | 707/5 |
| 2008/0010126 A1* | 1/2008 | Gunshor et al. | 705/14 |
| 2008/0016055 A1* | 1/2008 | Riise et al. | 707/5 |
| 2008/0040329 A1* | 2/2008 | Cussen et al. | 707/3 |
| 2008/0059424 A1* | 3/2008 | Tzamaloukas et al. | 707/3 |
| 2008/0077559 A1* | 3/2008 | Currie et al. | 707/3 |
| 2008/0082578 A1* | 4/2008 | Hogue et al. | 707/104.1 |
| 2008/0102856 A1* | 5/2008 | Fortescue et al. | 455/456.1 |

(Continued)

OTHER PUBLICATIONS

Pramudiono et al., "User Behavior Analysis of Location Aware Search Engine", Institute of Industrial Science, the University of Tokyo, 2002.*

(Continued)

*Primary Examiner* — Hanh B Thai
(74) *Attorney, Agent, or Firm* — Ditthavong Mori & Steiner, P.C.

(57) ABSTRACT

Performing location-aware search involves intercepting a network request targeted for an Internet-based search engine. The network request includes a location-dependent query containing a location term, and the location term cannot be used by the search engine to positively determine a target location. A location descriptor that can be used by the search engine to positively determine a target location is determined via a location database. The location database may include a location sensor such as GPS. The network request is modified to replace the location term with the location descriptor, and the modified network request is sent to the search engine.

25 Claims, 8 Drawing Sheets

U.S. PATENT DOCUMENTS

| | | | |
|---|---|---|---|
| 2008/0104227 A1* | 5/2008 | Birnie et al. | 709/224 |
| 2008/0132251 A1* | 6/2008 | Altman et al. | 455/457 |
| 2008/0172380 A1* | 7/2008 | Czyz et al. | 707/5 |
| 2008/0243821 A1* | 10/2008 | Santi et al. | 707/5 |
| 2008/0250358 A1* | 10/2008 | Mitchem et al. | 715/855 |
| 2009/0019362 A1* | 1/2009 | Shprigel et al. | 715/256 |
| 2009/0049051 A1* | 2/2009 | Horowitz et al. | 707/10 |

OTHER PUBLICATIONS

Wirefly Blog, "Sprint, Microsoft Present Location-Aware Search", Sep. 18, 2007.

Mobiledia, "Sprint, Microsoft Deliver Mobile Search Innovations", Sep. 18, 2007.

* cited by examiner

METHOD, SYSTEM, AND APPARATUS FOR LOCATION-AWARE SEARCH

FIELD OF THE INVENTION

This invention relates to computerized, location-aware, network content search.

BACKGROUND OF THE INVENTION

Search engines are powerful tools for finding content on the Internet. Some of these search tools have been extended so that people can find services in a specified area or near a specified address. For example, a person may append use a city name to a search query (e.g. "New York" or "Helsinki") in order to specify the search area. This, however, may give search results in a very wide area, thus requiring the user to go through a large amount of irrelevant results. Another option is to use a specific address or postal code to define the area, and the search results are limited and/or ranked based on distance from the address/code. This can be effective, but only if the user is aware of a specific address where they are currently located. When a person is on the go, they often are unaware of any such address. Even when the address is known, the entry of an address also requires a fair amount of typing, which can be inconvenient for small devices such as cell phones or personal digital assistants (PDA).

Another option is to search from an already visible portion of a map. This requires that the user browse to or search for the correct general area and then zoom the map to restrict the search area. This minimizes the amount of typing needed, but the swapping in and out of map images can be very expensive in terms of network and processing bandwidth. Notwithstanding the above, refining search results based on physical location is highly useful for providers of products and services, as well as for consumers who are interested in locating those providers.

SUMMARY OF THE INVENTION

To overcome limitations in the prior art described above, and to overcome other limitations that will become apparent upon reading and understanding the present specification, the present invention discloses a system, apparatus and method for location-aware, network content search. In one embodiment of the invention, an apparatus includes a network interface capable of communicating with an Internet-based search engine. A processor coupled to the network interface and memory is coupled to the processor and a location database. The memory includes instructions that cause the processor to intercept a network request targeted for the search engine. The network request includes a location-dependent query containing a location term. The location term cannot be used by the search engine to positively determine a target location. A location descriptor that can be used by the search engine to positively determine the target location is determined via a location database of the apparatus. The network request is modified to replace the location term with the location descriptor, and the modified network request is sent to the search engine.

In more particular embodiments, the location database may include a global positioning satellite sensor, and the location descriptor may include at least one of a street address and a geo-location descriptor. The location database may include a proximate mobile device externally coupled to the apparatus, and the mobile device may include a mobile Web server that provides the location descriptor in response to a Web service request. The location term may include a generic term indicating the current location of the apparatus, and/or the location term may include a reference to a dynamically generated navigational route of a navigation application.

In particular embodiments where the location term includes a reference to a dynamically generated navigational route, the location descriptor may include a plurality of location descriptions along the route. Also in this case, the memory may include instructions that further cause the processor to determine, via the location database, a current location of the apparatus while the apparatus is traversing the navigational route, and limit the location descriptor to a region that includes portions of the navigational route not yet traversed. In another variation of this particular embodiment, the memory includes instructions that further cause the processor to repeatedly determine, via the location database, current locations of the apparatus while the apparatus is traversing the route, form additional network requests based on the modified request and current locations, and send the additional requests to the search engine while the apparatus is traversing the route.

In another embodiment of the invention, a method includes intercepting a network request targeted for an Internet-based search engine, wherein the network request includes a location-dependent query containing a location term, wherein the location term cannot be used by the search engine to positively determine a target location. A location descriptor that can be used by the search engine to positively determine a target location is determined via a location database of the apparatus. The network request is modified to replace the location term with the location descriptor, and the modified network request is sent to the search engine.

In another embodiment of the invention, a computer-readable storage medium includes instructions executable by a processor of an apparatus for: a) intercepting a network request from an apparatus that is targeted for a search engine, wherein the network request includes a location-dependent query containing a location term, wherein the location term cannot be used by the search engine to positively determine a target location; b) determining, via a location database of the apparatus, a location descriptor that can be used by the search engine to positively determine the target location; c) modifying the network request to replace the location term with the location descriptor; and d) sending the modified network request to the search engine.

In another embodiment of the invention, a system includes: a) means for intercepting a network request from an apparatus that is targeted for the search engine, wherein the network request includes a location-dependent query containing a location term, wherein the location term cannot be used by the search engine to positively determine a target location; b) means for determining, via a location database of the apparatus, a location descriptor that can be used by the search engine to positively determine the target location; c) means for modifying the network request to replace the location term with the location descriptor; and d) means for sending the modified network request to the search engine.

These and various other advantages and features of novelty are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWING

The invention is described in connection with the embodiments illustrated in the following diagrams.

DETAILED DESCRIPTION OF EMBODIMENTS OF THE INVENTION

Figure 1:
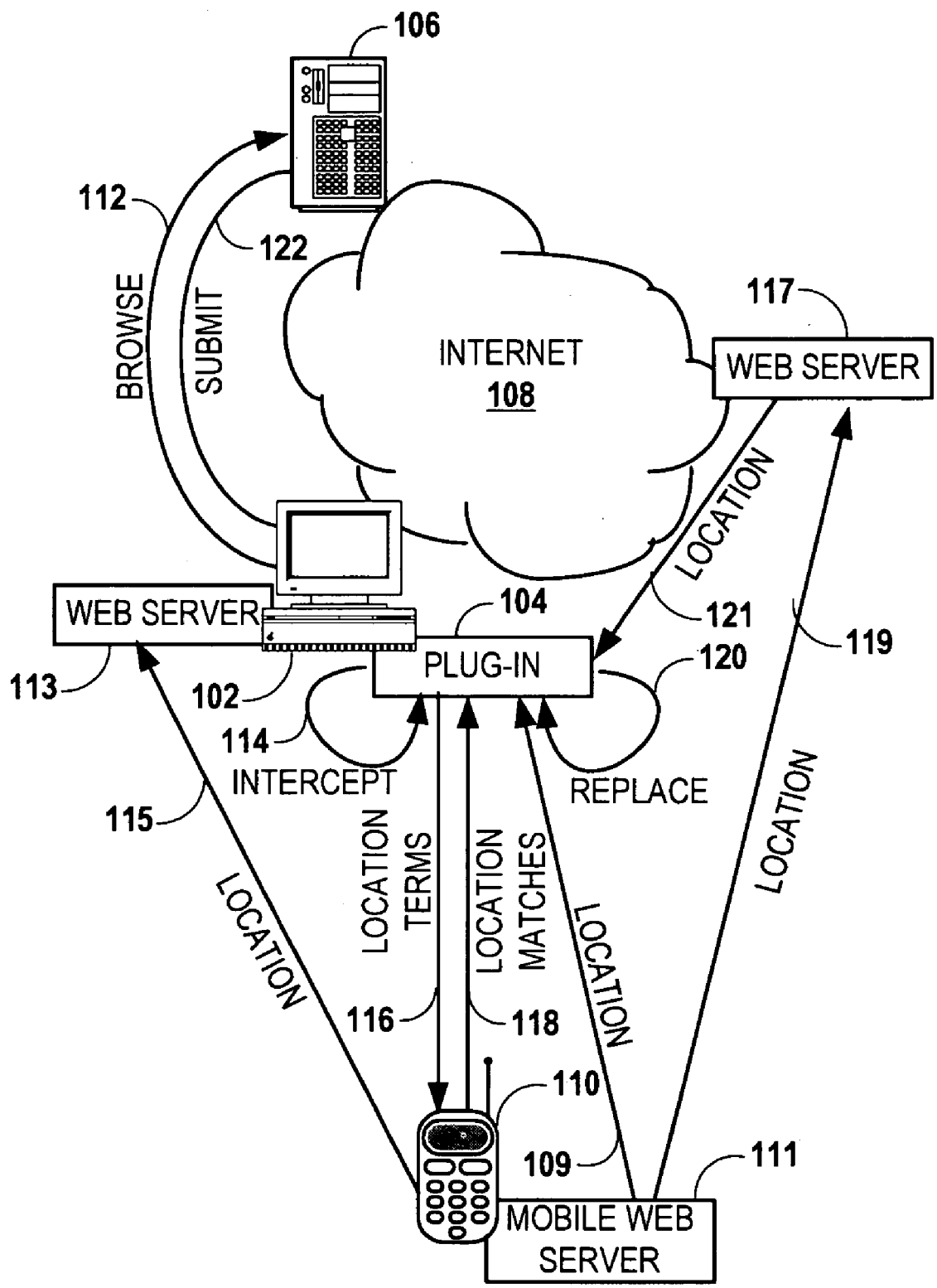
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

The Internet has become such a vital communications medium not only because of its global reach, but also because of its local relevance. Internet gives users the power to discover and communicate with others across the globe with which they share interests. At the same time, the Internet provides a very easy medium to find local products and services. There will always be products and services that require physical presence of a customer with a vendor (e.g., haircuts, auto maintenance, restaurants), therefore such business may conduct little or no commerce on the Internet. Nonetheless, maintaining even a simple web page can help attract new customers. As local businesses continue to increase their presence on the Internet, the Internet may become the dominant means of attracting walk-in customers, edging out traditional methods such as phone book listings or newspaper advertisements.

For these types of businesses, it has been recognized that users may want to restrict search engine results based on location. This restriction may be in the form of simple narrowing of results based on additional terms (e.g., "Chicago music stores") which may by itself limit the search to at least some relevant content. In other cases, a search engine may also utilize an index (similar to a phone book or contact list) that has exact addresses/locations for particular businesses. These locations may be derived from the target business sites themselves, and/or from secondary sources such as public or private directory listings. In either case, such an index allows search results to be ranked by distance from a given point, and also allows results to be displayed graphically on a map. So, for example, in response to a query such as "Chicago music stores," the result may be a list of music stores and their addresses, and the results may be ranked by, for example, the distance from the city center.

Oftentimes, a user wishes to find a target business or venue that is close to his or her current location. In many cases, this current location may include one or two fixed locations that are frequently used in running the searches (e.g., user's home or work), as this is where a fixed computer running the search located. However with the increased use of mobile computing and wide-area wireless data networks, the target location for a search may be arbitrary, such that a search may originate from where ever the user happens to be at the moment. In either event, it could be useful if the user could simply and consistently signal that a location-dependent search be initiated based on the user's present location (or some other location), without the user having to specify an explicit description (e.g., address or geo-coordinates) of that location.

As an example, the user could predefine a location, such as "my-home," where the address (or other geolocation data, such as latitude and longitude) is stored on the user's computer in a manner similar to an Internet bookmark or shortcut. Therefore, when typing in a search request, the user could use a query such as "restaurants near my-home," and the stored address/geolocation data could be automatically retrieved and a replacement made in the query before it is sent out to the search engine. Other predefined locations may already be available on other databases of a user device. For example, a user may have an address book application on a mobile with names and addresses of contacts. The names of those contacts could automatically be included as known keywords to location searches, so that a query such as "store near Floyd" will determine and use addresses of any names in the address book containing the word "Floyd."

In another example, the device may include the ability to determine its present location. In such a case, the user may be able to use a key phrase such as "near here" to restrict searches, and this can be parsed and the location substituted for the phrase. Such location detection may use any combination of GPS, inertial navigation, cellular base station localization, determination based on network data (e.g., IP address, Wi-Fi, SSID), etc.

In various embodiments of the invention, a user can utilize a custom location database (e.g., keywords and/or location sensing within a mobile device) in a local search. Such search may be performed in a mobile device, a personal computer, or any other device (e.g., appliance) with a browser. In one embodiment, a browser plug-in modifies a local search page (e.g., Yahoo!™ Local or Google™ Maps), so that when the user submits the search, the plug-in intercepts the search, extracts the location criteria, fetches the selected location from a predetermined device (e.g., the user's mobile device) and replaces the location criteria with the one fetched from the device. In another embodiment, a plug-in or other software may be used to similarly extend other programs, such as a public transport journey planner (e.g., http://aikataulut.ytv.fi/reittiopas/en), automobile/pedestrian journey planner, store locator on a commercial web site, etc.

These various adaptations allow a user to define a current sensed location such as "here" to be used in location-limited/location-ranked results. The user may also use special or custom identifiers that allow further refinement of the search results, such as "within walking distance," "within a five minute drive," "south of here," etc. Similarly, the user may define a name of a landmark or place and store it in the mobile device. This stored data can also be used to replace a keyword (e.g., the name of the stored location) with an address or geolocation in a search.

In another scenario, the search engine may be integrated with a navigation application, such as an application that provides real-time routing assistance. In such a case, the current navigation route (e.g., starting point, destination point, or any point in-between) route can be provided as location criteria for the search. For example, such a query might be "find restaurant along current route." The query may be made before the journey has begun, such that results along the whole route may be returned. If the route is used as criteria, the plug-in can conduct a series of searches using points along the route as search locations and show the search results in the order starting from starting point. In another situation, the query may be submitted while the user is en route, and therefore results may be restricted to those parts of the route not yet traversed. In this situation, the plug-in may fetch the current location of the user periodically/when it changes and conduct the search again, now and then providing results local to the user.

If there are several possible locations fetched from the mobile that match the user's location definition, the browser plug-in can show a popup with the possible matches, and allow user to select one of them. It is also possible to display the list of pre-defined landmarks in the search page before the search is conducted and allow the user to select one of them, or use auto-fill to ease inputting the location. Where the search is related to a navigational route, the selection of a search result may be used to modify the route. For example, a selection of a restaurant may change the waypoints of the current route so that the user is diverted to a side street where the selected restaurant is located.

The methods, apparatus, and systems described herein do not necessarily require any changes in the existing local search systems or web pages. For example, commonly-used browsers include plug-in interfaces that allow extensions to functionality as described herein. Thus these adaptations may be provided where searches are conducted using a browser. Further, applications that are not traditionally viewed as "browsers," such as navigation programs, email, calendar, contact manager, etc., may include browser-like functionality, and may even directly incorporate some or all of the executables and/or libraries of browsers (e.g., Firefox™, Internet Explorer™) already installed on the system.

In addition to using location, other context information, such as local time, surrounding people, weather, and other common context information, can be used to enhance the search. For example, the operating hours of businesses may be available on the business site or elsewhere, and such search results may be limited based on whether or not the business is currently open, or would eventually be closed based on an estimated arrival time. If store opening times are known, the limiting of the stores already closed/not yet open could be accomplished by excluding or graying out those stores in the search results. The arrival time can be calculated based on current time, distance to target, transportation mode, traffic conditions, etc. In some embodiments, such calculated absolute or relative arrival time can be used as a modifier to location search. For example, a query could use a search such as "grocery store within 15 minutes of here," where the mode of transportation is specific to the user and known to the system. Thus, results could be quite different for users who have defined different primary modes of transportation (e.g., walking, mass transit, automobile).

In another example, such a browser enhancement and/or plug-in can identify addresses on web pages (e.g., in search results, company pages, yellow pages etc.). Such identification can be made based on common address patterns or doing lookups to address databases. The plug-in makes the addresses clickable in the web browser, enabling the user to interact with the addresses. Upon clicking an address a popup is shown allowing the user to, for example, send the address to the map application in the mobile, save the address as a landmark and command the mobile to start navigating to the address from user's current location or other location defined by the user.

In reference now to FIG. 1, a block diagram shows a high level architecture according to one embodiment of the invention. In this embodiment, a personal computer (PC) 102 includes a plug-in 104 that is used to extend a program such as a browser. The computer 102 is used to access a search service 106 via the Internet 108 or similar wide area network. The PC 102 is also coupled to a locally-situated mobile device 110. The mobile device 110 may include a mobile phone, personal digital assistant (PDA), media player, navigation device, etc, and may communicate with the PC 102 via wired or wireless connections, including Wi-Fi, Bluetooth, Wireless Universal Serial Bus (USB), Infrared Data Association (IrDA), etc.

The plug-in 104 is capable of accessing location information from the mobile device 110. The mobile device 110 generally runs some software that makes it possible for the plug-in 104 to access the location information, such as a mobile web server 111 (e.g., http://mymobilesite.net) which supplies location data via path 109. Another way for the plug-in 104 to access the location information is to use a Web server 113 running in the PC 102. In such a scenario, the mobile device 110 may periodically send location data 115 to the Web server (e.g., via an HTTP POST) using some predetermined polling interval, and the PC 102 can cache the latest value of data and access it locally. In another arrangement, a separate Web server 117 can determine location 119 of the mobile device 110 (e.g., such as implemented in Nokia™ PC Phone; http://www.nokia.com/A4705179). In this case, the plug-in 104 would connect to the Web server 117 instead of the mobile device 117. The Web server 117 may have access to the mobile 110 over local connectivity (Bluetooth, cable, etc.) or using network protocols such as TCP/IP and HTTP. This latter approach has the advantage that the landmarks, and other user defined location data can by synchronized between the PC 102, the mobile device 110, and the Web server 117, even when the mobile 110 and/or PC 102 are not connected/accessible.

The plug-in 104 may be configured to detect browsing 112 to a page of a local search service (e.g., Yahoo! Local or Google Maps) of the server 106. The plug-in 104 modifies the page's functionality (e.g., utilizing JavaScript and Document Object Model access) so that when the user conducts a search, the search is intercepted 114 before being sent. The intercepted 114 search criterion is parsed to determine one or more location terms 116. These location terms 116 are typically not usable by the service 106 to positively identify the requested location. Example location terms 116 include generic terms (e.g., "here," "nearby," "anywhere") special identifiers (e.g., "my-home," "my-work") and modifiers ("near," "within X kilometers from"), etc. The location terms 116 are sent to the mobile device 110, such as by using an Asynchronous JavaScript and XML (AJAX) request. The mobile device 110 matches the location terms 116 against any combination of currently sensed location, landmarks and a navigation application's route definition. The mobile device 110 returns a list of possible matches 118 to the browser plug-in 104. The plug-in 104 then replaces 120 the original location term with a positive identifier returned 118 by the mobile 110 (assuming there is at least one match in the returned list 118) and the modified search 122 is submitted to the search engine 106. If there is more than one match in the returned list 118, then the user may be asked to select one, and the location criteria is replaced 120 by the selected location data, and the modified search 122 is submitted. If no match was found, the search may be submitted 122 unchanged, and the user may or may not be notified.

In one arrangement, the plug-in 104 may cache query data 118 received from the mobile device 110 for future use. Assuming the PC 102 remains in a fixed location, a query for current location may only need to be submitted to the mobile device 110 once, or only re-queried after some event. For example, it is unlikely that a desktop PC 102 was moved while continuously powered on, so a refresh of the cache might be needed only if the PC 102 was powered down since the last query. Similarly, caching of user defined data/landmarks will facilitate keeping the PCs user data in synchrony with the landmarks in the mobile 110, and such cache data can be used when the mobile 110 is not accessible and/or when the latency is too big.

Figure 2A:
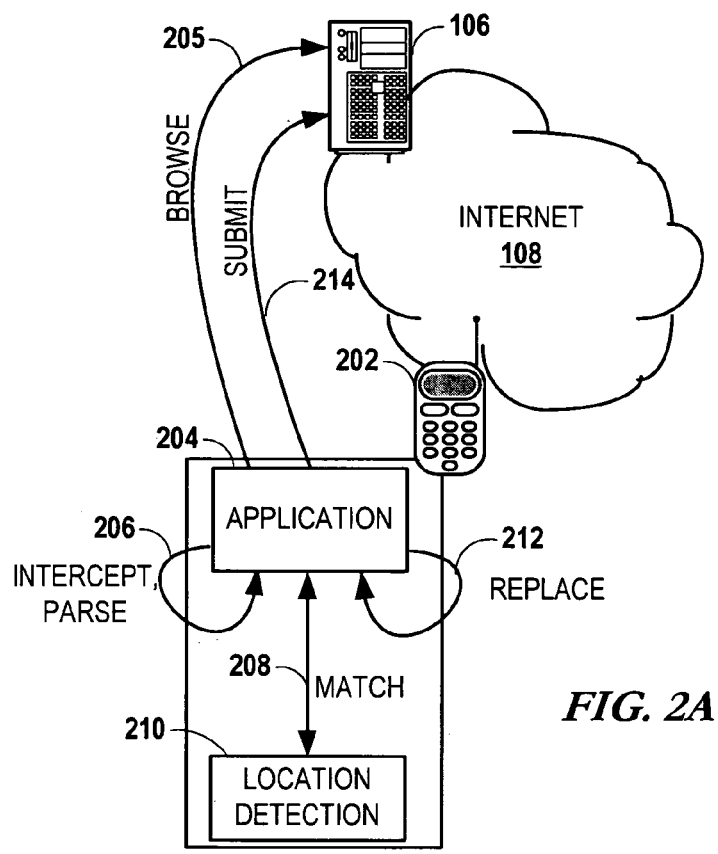
FIGS. 2A-B are block diagram illustrating alternate systems according to embodiments of the invention.

In reference now to FIG. 2A, a block diagram shows a high level architecture according to another embodiment of the invention. In this embodiment, a mobile device 202 includes an application 204 that may be a browser or other user interface software. The application 204 is used to access the search service 106 via the Internet 108, such as was described in relation to FIG. 1. It will be appreciated that even where the search provider 106 is the same as described in FIG. 1, the data provided to the mobile device 202 may be different than analogous data provided to the PC 102 of FIG. 1. Often, web service providers will detect that the source of a request is a mobile device 202, and prepare an alternate page better suited to small form-factor devices. It will be noted that the various embodiments of the invention do not depend on a particular service provider 106, nor on a specific content format provided based on the type of device making the request. Generally, it may be preferable to have the location-aware search work the same on a wide variety of devices and providers so as to provide a consistent experience to users.

The mobile device 202 may include a mobile phone, PDA, media player, navigation device, etc, and may communicate with the Internet 108 via various networks and media, including Wi-Fi, Ethernet, $3^{rd}$ Generation cellular data networks (3G), etc. The mobile application 204 detects a browse request 205 and intercepts 206 a search submission associated with that request 205. The application 204 parses the intercepted search submission 206 for location criteria and matches 208 the location criteria to location information via a location detection module 210. The module 210 can determine location using any combination of Global Positioning Satellite (GPS), cell base station identification, Wi-Fi positioning, and any other positioning technology known in the art. The module 210 may also store keywords, landmarks, or any other user designated shortcut that can be used to look up a location that would otherwise be unusable by the service 106. The application 204 then replaces 212 the location criteria in the search criteria and submits 214 the search to the service 106. The application 204 can be custom-made to perform these functions, or can utilize a plug-in or helper application to extend the existing functionality of an existing application 204.

Figure 2B:
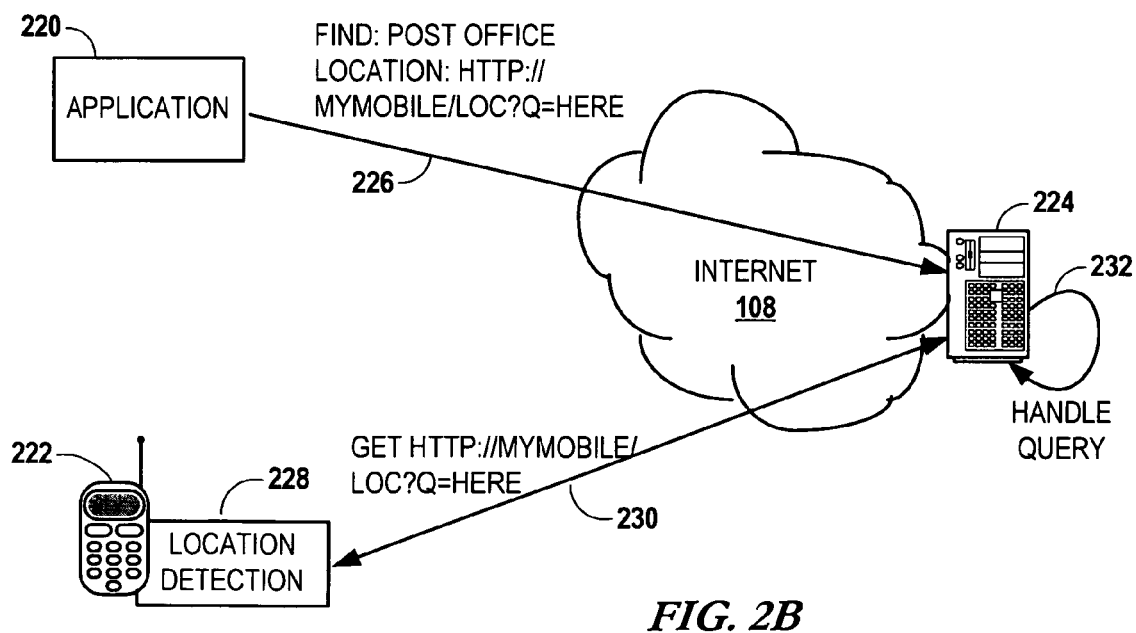

Another alternative architecture according to an embodiment of the invention is shown in FIG. 2B. In this example, an application 220 may run on a PC (e.g., PC 102 in FIG. 1) or on a mobile device 222. The application 220 includes enhancements that cause location queries to be modified to insert data (e.g., a URL) that allows a local search service 224 to find the target location for itself. In this embodiment, the server 224 performs modifications to the query based on specific data given to in by the application 220. For example, in response to query to find a "post office here," the application would form a query 226 that includes both the URL of a mobile location server 228 of the mobile device 222 and arguments to retrieve the correct location. This query 226 is sent to the service 224, and the service 224 performs a network request/response 230 in order to retrieve the location. The location retrieved from this transaction 230 can then be used by the service 224 to handle 232 the query. It will be appreciated that where the query 226 is related to the present location, the mobile device 222 and apparatus running the application 220 (if different from mobile device 222) may need to be proximately co-located. However, for queries utilizing user-defined location data stored on the mobile device 222 (e.g., static landmarks, contact addresses), the co-location of mobile device 222 and application 220 may not be needed.

If a route defined in the mobile's navigation application is used as the location criteria and the search engine does not support providing multiple search locations, the plug-in can conduct a series of searches to the search engine utilizing AJAX requests, parse the results and show them to the user in appropriate order utilizing similar UI as the search engine would provide. An equivalent technique can be used to conduct "live" searches that are updated while the user is moving.

Embodiments of the invention described herein offer many advantages. For example, user can utilize his current location with minimal effort (e.g., by typing "here"). The user can enter an actual location to a local search very easily, such as by the use of familiar names for locations (e.g., landmark names or user designated labels) instead of addresses or city names. Further, such a system can be implemented with no modifications to existing search services, thus there is no need to have agreements with different search providers. Further, such a system can be easily introduced into existing browsers and other application programs through the use of plug-in architectures and other means of extending program functionality that are known in the art.

Figure 3A:
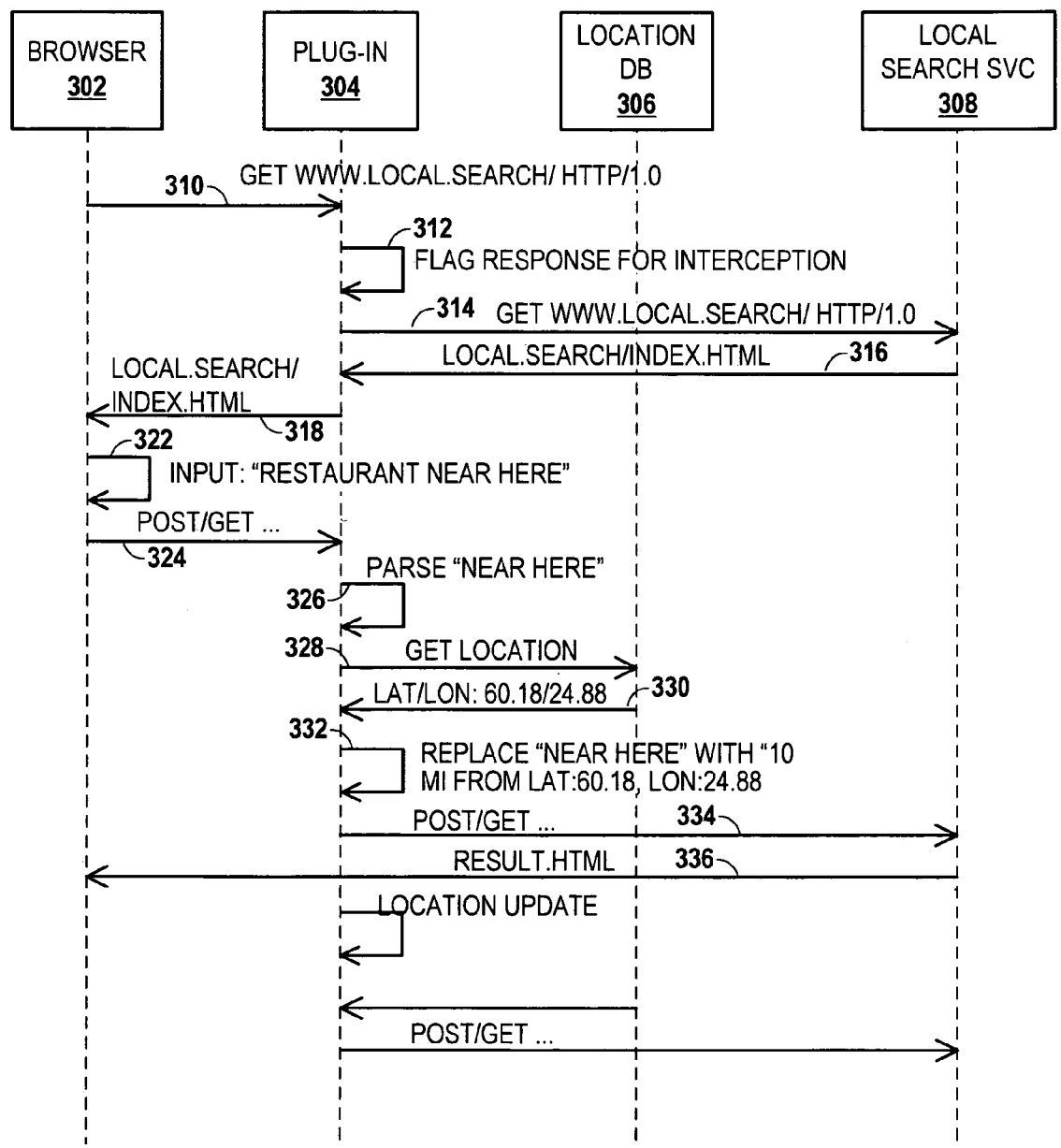
FIGS. 3A-B are a sequence diagrams illustrating data exchanges according to embodiments of the invention.

In reference now to FIG. 3A, a sequence diagram illustrates an example scenario for improved location aware search according to an embodiment of the invention. In this diagram, a user interacts with a browser 302 that may run on any network-connected computing device. The browser 302 is extended by way of a plug-in 304 that interacts with a location database 306. Those of skill in the art will appreciate that the various components 302, 304, 306 may be implemented as any combination of separate/distinct operational components and single/monolithic programs. The browser 302 and plug-in 304 may be capable of independently interacting with a local search service 308 via a network. The term "local search" as used in relation to the service 308 refers to a content search that limits, ranks, and/or otherwise returns search results depending on a geographical location contained in the query, and is not intended to describe the location of the service 308 itself.

The plug-in 304 may be integrated to detect a browse request 310 directed to a particular Uniform Resource Locator (URL). The plug-in 304 may be interested in a select number of target search services. Therefore, if the request 310 is directed to one of those select services (e.g., service 308), this can be flagged 312 for possible further processing. In this example, the plug-in 304 forwards 314 the request to the search service 308, which responds with a document 316 that is forwarded 318 on to the browser 302. It will be appreciated that embodiments of the invention may use alternate implementations to those described above. For example, the browser 302 may directly perform the request 310 and response 318 actions with the service 308, and the plug-in 304 may only passively detect this data, such as through a callback registered with the browser 302. Further, the detection 312 of target URLs may make the plug-in operate more efficiently, but may not be required for proper operation.

In some embodiments, the plug-in may need to perform some analysis of the received document(s) 316 in order to determine content that may be used for search input. For example, rendered objects such as Hypertext Markup Language (HTML) forms, HTML input tags, JavaScript™, Flash™ objects, etc. may be known beforehand or determined at run-time to be used for submitting search queries to relevant services. In this example, the user inputs 322 data to one such object, and in response, another request 324 is targeted for the service 308 using a Hypertext Transfer Protocol (HTTP) POST or GET method. The plug-in 304 intercepts this request 324 and determines that a location-based query that was input to the rendered object. For example, if the search query "gas station near here" was typed into an HTML input object named "query" that is itself part of a form that defines a GET action to the URL "http://10.0.0.10/search," the request 324 may take the form of "GET http://10.0.0.10/search?query=gas+station+near+here HTTP/1.1." It will be appreciated that target sites may explicitly delineate the location from other parts of the query. For example, a page that has both a "Find Businesses" text entry box and "Near Location" text entry box may send a query in a form such as "?find=gas+station&location=near+here," in which case only the "location" portion need be examined.

If the plug-in 304 determines that the request 324 contains a query of interest, the plug-in 304 will parse 326 the data. In this example, parsing 326 involves determining that the terms "near here" were intended to make results depend on the location "here." The service 308 typically cannot determine with sufficient accuracy where "here" is, and therefore the plug-in will query 328 the location database 306 for the current location. The database returns 330, in this example, a latitude/longitude value. The database 306 may include a hardware interface that can detect current location through various means such as GPS and/or cellular stations. The database 306 may also include known locations that can be accessed by a keyword (e.g., "Joe's house").

The parsing 326 may or may not examine or modify the modifier "near." Some search engines already may make a reasonable guess as to what "near" means in the context of such a search. However, the plug-in 304 may give the user the opportunity to override search engine behavior by substituting terms such as "near," "at," "close to," "by," "nearby," etc., to include more precise definitions, such as a radius or rectangular boundaries. In this example, the plug-in 304 has replaced 332 the term "near hear" with "10 mi from lat:60.18, lon: 24.88," which is presumably parse-able by the target service 308. This modified request is then sent 334 to the search service 308 which returns the resulting content 336.

It will be appreciated that many variations of the sequences shown in FIG. 3A are possible in accordance with embodiments of the present invention. For example, instead of parsing 326 the query after it has been posted 324, the plug-in 304 could observe the input 322 typed by the user and when typing pauses, make the location query 328 to the database 306 before the submit/search button has been pressed. The plug-in 304 may provide a real-time drop down list that provides known keywords, and/or real time reformatting of the text as it is being typed (e.g., parsing each word as whitespace is detected). In such a case, the search button can be made unclickable until the location query has been made, or by using any other means known in the art to notify the user of the ongoing location check.

Figure 3B:
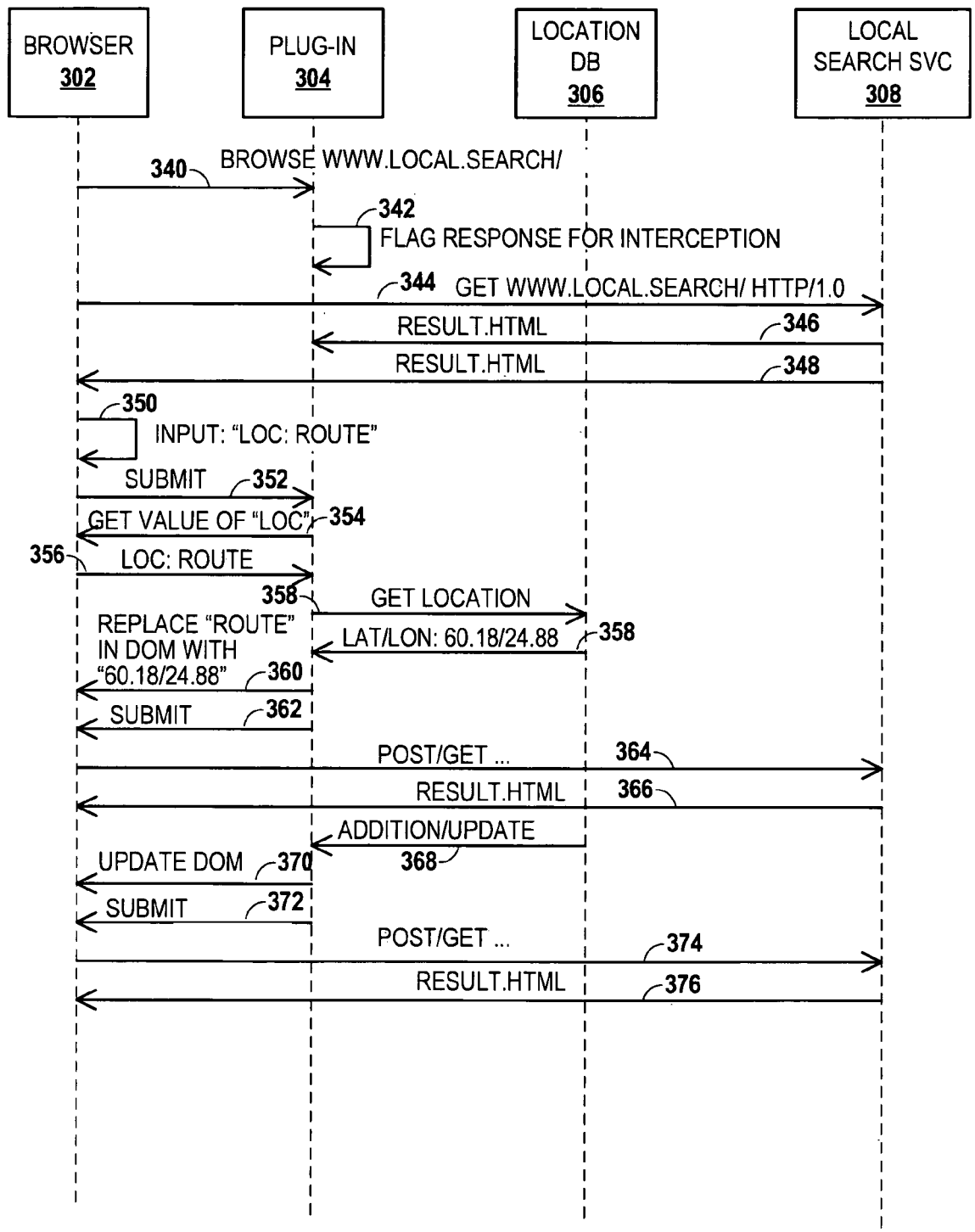

In another variation, the replacement 332 may be made by the browser 302 instead of the plug-in 304. In this variation, the plug-in 304 may still perform the lookup 328, 330, but the replacement 332 is done in the browser Document Object Model (DOM), after which the plug-in 304 commands the browser 302 to submit 334 the form. An example of this type of interaction is shown in FIG. 3B, which is a sequence diagram showing interactions according to another embodiment of the invention. In FIG. 3B, the same reference numbers may be used to denote analogous components as were described in relation to FIG. 3A.

As in FIG. 3A, the plug-in 304 in FIG. 3B may be integrated to detect a browse request 340 directed to a particular URL, e.g., a target search service URL. This request 340 may be in the form of a user interface action such as typing a URL, selecting a hyperlink, selecting a bookmark, etc. The request 340 is flagged 342 for possible further processing, and the browser 302 sends 344 the request to the search service 308. The search service 308 responds with a results document 346, 348 that may be detected by one or both of the browser 302 and plug-in 304.

The target document 348 is displayed to the user via the browser 302, and the user inputs 350 data to a location entry object. In response to submission of the document (e.g., selection of a "Submit" button on the Web page) a submit callback 352 is sent to the plug-in 304. In response to the submit action 352, the plug-in 304 temporarily suspends the submission and queries 354 the DOM for a value of interest, in this example the value of "loc." Based on the response 356, the plug-in 304 determines that the target location is the current route, which may refer to an actively traversed route or a saved route. In either case, the plug-in queries 358 the location database 306 for the location data associated with the route. In this example, the database 306 returns a single point 358, and the plug-in 304 and database 306 may negotiate (not shown) whether or not multiple points are used as part of the submission 352. Multiple points may be used where the route is modeled as a plurality of points (e.g., a linear interpolation of a path) and/or where the browser 302 dynamically updates results based on traversal of the route. In other scenarios, the returned value 358 may include a list of points and/or geometric parameters that allow a route or other area to be defined using a single network request.

In response to the database result 358, the plug-in 304 modifies the DOM to replace 360 the term "route" with the lat/lon data obtained from the database 306. The plug-in 304 then signals 362 to the browser 302 to continue with the submission, which is represented by the POST/GET action 364. The resulting document 366 is returned to and displayed in the browser 302. Afterwards, the database 306 may send an addition or update 368, which may include additional points of a route, or include an updated position of a currently traversed route. As before, the plug-in modifies 370 the DOM and causes 372 the browser to submit the request 374 to the service 308. The service 308 sends the response document 376, here shown being sent to the browser 302. In other arrangements, the subsequent postings 374, 376 can be sent and/or received by the plug-in 304, and the plug-in 304 updates the DOM of the currently displayed document (e.g., modifies result document 366).

Figure 4:
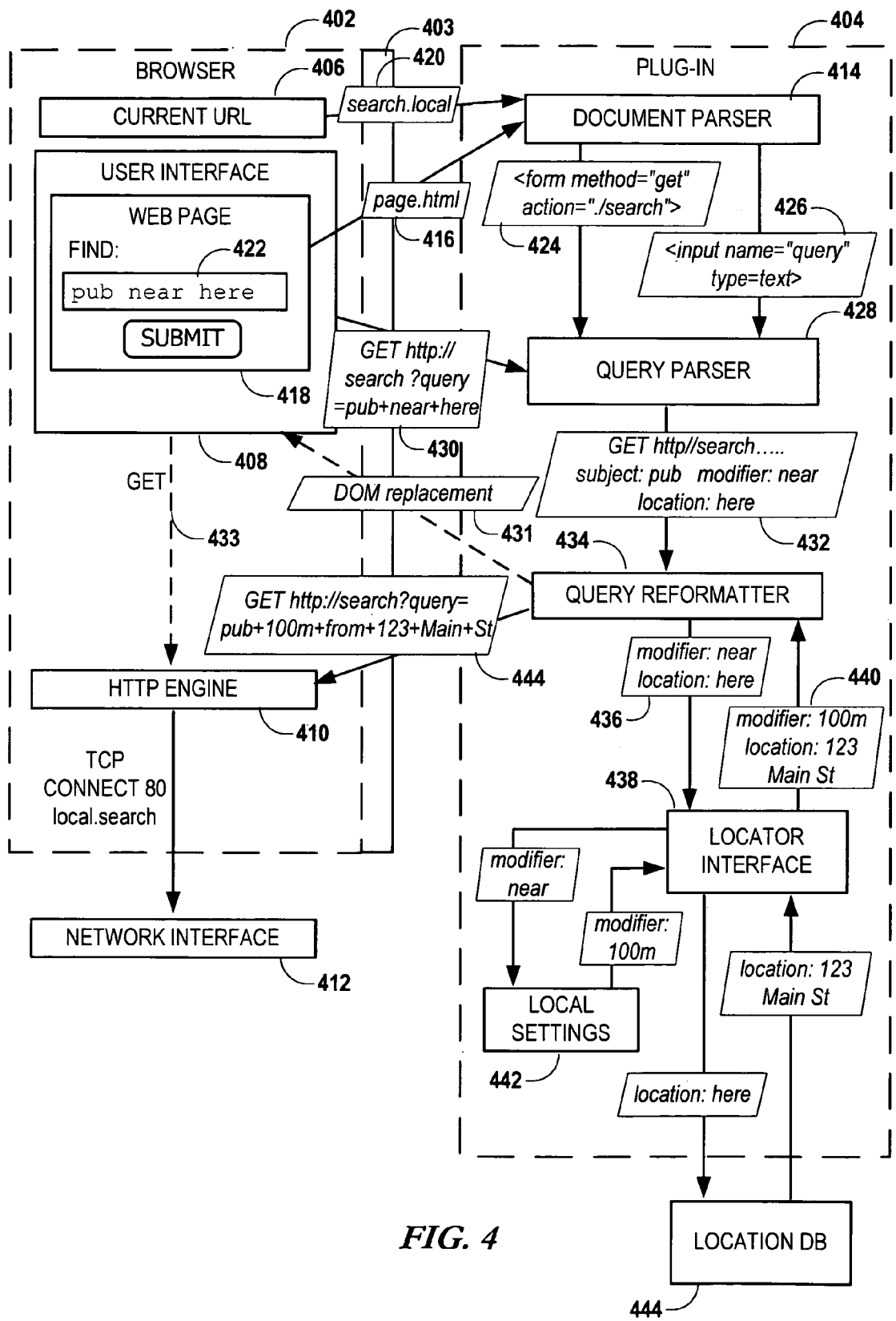
FIG. 4 is a block diagram illustrating component interactions according to embodiments of the invention.

In reference now to FIG. 4, a block diagram illustrates interaction between software components according to an embodiment of the invention. The components illustrated in FIG. 4 may be included on one or more user devices, and at least one of those devices is capable of submitting network queries to a search engine (not shown). A user application, here shown as browser 402, incorporates a plug-in 404 that modifies behaviors of the browser 402 and/or modifies network content handled by the browser 402.

A plug-in interface 403 of the browser 402 may be used by the plug-in 404 to determine state data, such as the currently requested/shown URL 406. Other data exposed by the interface 403 may include events and data associated with a user interface 408. The browser 402 also includes an HTTP engine 410 that provides the low-level functions associated with HTTP data transport via network interface hardware/software 412 of a user device. The function and arrangement of these components 406, 408, 410, 412 are provided for purposes of illustration; many other arrangements may be possible in current and future browsers 402, and other user applications.

The plug-in contains a document parser 414 that parses documents (e.g., document 416 being displayed as Web page 418 in the browser 402). The document parser 414 may use the browser DOM to access the different elements of the rendered page. The document parser 414 may also read value of the current URL 406 of the browser 402 (e.g., URL data 420) to trigger whether or not parsing is needed. In this example, the Web page 418 includes a text box 422 that is rendered to the user and is used for text input. The document parser 414 may determine that this text box 422 is of interest based on the underlying text in the document 416, namely via a form tag 424 and input tag 426 that describe, respectively, the target action/URL and the variables of interest submitted with the action. This data of interest 424, 426 may be known beforehand, or derived such as from a Document Object Model (DOM) that describes the target search service pages.

The data 424, 426 extracted from the document parser 414 is used as input to a query parser 428. The query parser 428 monitors any network search queries made based on identified user interface components 424, 426. In this example, a query is represented by an HTTP GET 430. The query parser 428 intercepts the query 430 and extracts the relevant components 432. Two of the data components 432 (modifier and location) may be targeted for reformatting, and therefore the query parser 428 passes the relevant parsed data 432 (as well as other data contained in the original method call 430) to a query reformatter 434.

As described above, the query parser 428 may need access to the network layer of the browser 402 in order to directly intercept the query 430 in the form of an HTTP GET. Such access may or may not be possible, depending on the limitations of the plug-in interface 403. An alternate way to accomplish this is to add a hook to the "submit" event of the forms contained in a given Web page 418. When the form is submitted, the data in the query 430 is received by a handler (e.g., query parser 428) that extracts the search terms from the input fields using DOM access. In such a case, the query parser 428 may be acting as a DOM parser, as it is looking for particular elements within the DOM for search terms, and handing the search terms to the query reformatter 434. The handler 428 also prevents the submit event from being sent by the browser 402. In such a case, the reformatter 434 would reformat the query for purposes of replacing it in the DOM, as represented by replacement data 431. After the replacement 431, the plug-in 404 causes the browser 402 to submit the form, as represented by path 433.

The query reformatter 434 may have one or more behaviors that are defined depending on user preference and/or type of query. In this example, the reformatter 434 extracts a subset 436 of the parsed data of interest and sends this subset 436 a locator interface component 438. The locator interface 438 is responsible for taking the generic inputs 436 and returning a specific output 440 if possible. The locator interface 438 may have two or more possible sources of data for providing this specific output. Here, these data sources are represented by local settings 442 and a location database 444.

Local settings 442 may include user configurable data such as behavior of modifiers and user-created keywords for known locations. The location database 444 typically includes some sort of measurement hardware that allows detection of current location. The location database 444 may be used in concert with the local settings 442, such as allowing the user to give the currently detected location a keyword name for later reference. The locator interface 438 may act as a generic interface that abstracts measured data and user defined data so that the query reformatter 434 can be used in different system configurations.

The query reformatter 434 uses the specific location identifiers 440 and uses them to form a modified query 444 and/or replace the search term is in the form field 442 by way of manipulating 431 the DOM. If the DOM is changed via action 431, then the browser 402 submits the query 433 as defined by the modified Web page 418 and in accordance with the appropriate Web standards. Where a modified query 444 is used, the modified query 444 may use the same method and target URL as the original query 430, or the reformatter 434 may redirect the query to another network location. This may be useful, for example, where a search engine uses alternate URLs depending on the types of grammars expected in query. In another example, the reformatter 434 may use an alternate access method (e.g., Simple Object Access Protocol, remote procedure call) that may be more suited for machine-to-machine interactions. If the reformatter 434 cannot improve the original query 430, then the reformatter 434 (or some other component of the plug-in 404 or browser 402) may allow the query 430 to be sent unchanged. It will be appreciated that changes to the DOM can also be used to modify the query as described above, such as by changing form submit methods, target URLs, etc.

Figure 5:
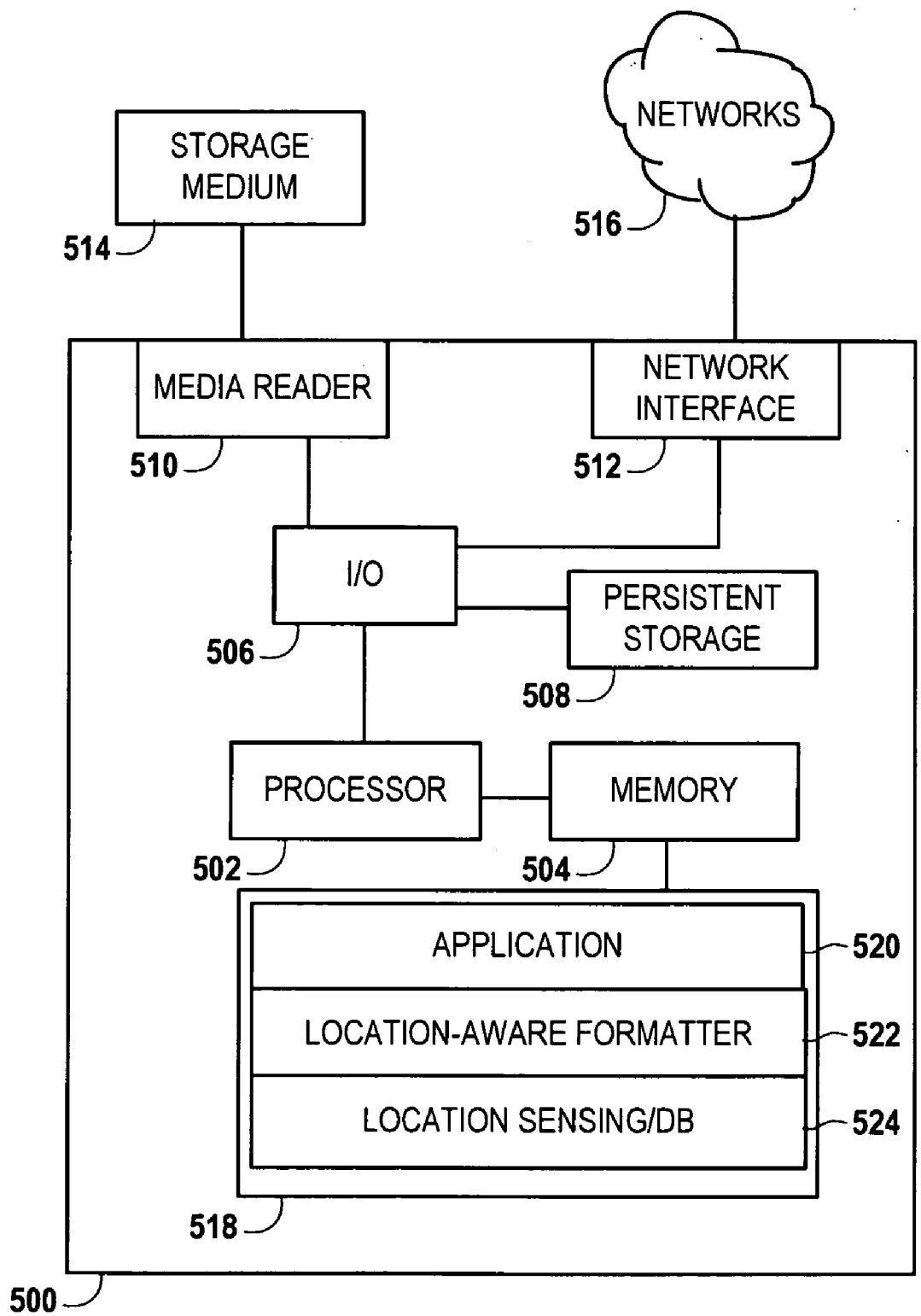
FIG. 5 is a block diagram showing an apparatus according to embodiments of the invention.

In reference now to FIG. 5, a block diagram illustrates an apparatus 500 that may perform location aware searching according to embodiments of the invention. The apparatus 500 may include a processor 502, memory 504, and an I/O bus 506 that couples peripheral devices to the processor 502. Those peripheral devices may include persistent memory storage 508 (e.g., disc drives, flash memory), one or more network interfaces 512, and a media reader 510 (e.g., tape reader, floppy drive, Compact Disc player, Digital Versatile Disc player, memory card reader, etc.). The media reader 510 is capable of reading from a storage medium 514, such as optical or magnetic media. The media reader 510 may also be capable of writing to the media 514. The network interfaces 512 may be capable of communicating via one or more networks 516. The networks 516 may utilize such media such as phone lines, coaxial cable, Ethernet, wireless radio transmissions, infrared transmissions, etc. The networks 516 may include Internet Protocol (IP) based public and private networks, as well as proximity networking such as Bluetooth and IrDA.

The operation of the processor 502 is dictated by instructions 518 that may be stored temporarily or permanently in memory 504 or other logic circuitry. The instructions 518 may be built into to the apparatus 500 during manufacture, or may be later transferred to the apparatus 500 via the storage media 514 or the networks 516. The instructions 518 include one or more applications 520 that are capable of engaging in with a location-cognizant search engine via the network 516. The applications 520 may be modified to include a location-aware formatter 522 that detects queries having location terms that cannot be used by the search engine to positively determine a target location. The formatter 522 intercepts these terms and uses a location sensing module and/or database 524 to determine a location descriptor that can be used by the search engine to positively determine the target location. The formatter 522 then modifies the query to replace the location term with the location descriptor. A modified network request containing the modified query is then sent to the search engine via the network 516.

The apparatus 500 may be configured as a mobile device, in which case the apparatus 500 usually includes a self contained power supply (e.g., batteries, solar cells, fuel cells) and a wireless network interface 512. In other embodiments, the apparatus 500 may be configured as a fixed device, such as a PC, server, set top box, media server, consumer appliance, etc. The apparatus 500 may include other well-known features that are not illustrated, such as user input devices, user output devices, power circuitry, sensors, etc. As will be appreciated by one of skill in the art, an apparatus having the functions described herein may include a combination of two or more proximately located user devices that are at least coupled via some data transfer medium, including wireless data coupling.

Figure 6:
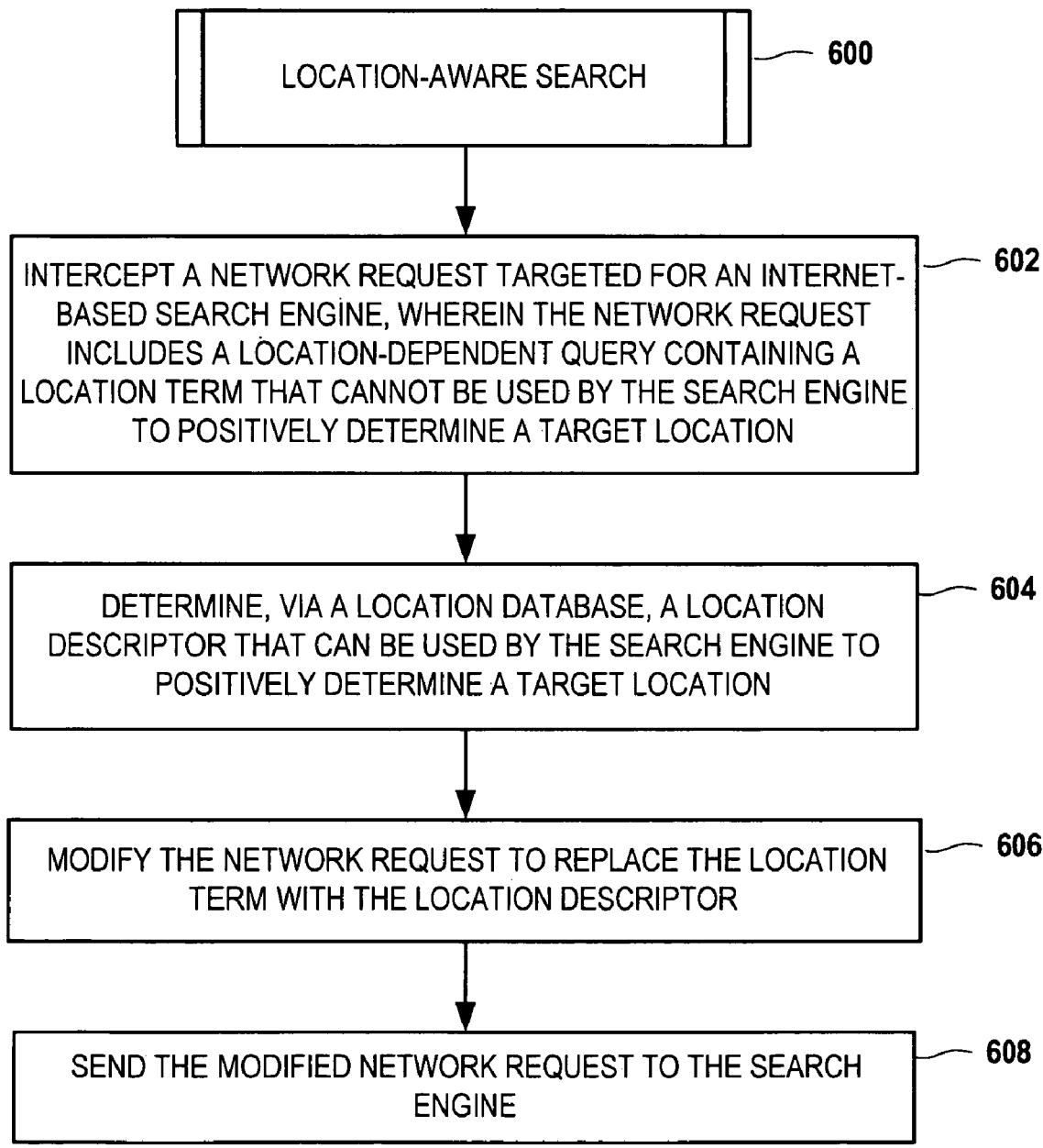
FIG. 6 is a flowchart showing a procedure according to an embodiment of the invention.

In reference now to FIG. 6, a flowchart illustrates a procedure 600 for performing location-aware search according to an embodiment of the invention. A network request targeted for an Internet-based search engine is intercepted 602. The interception 602 of the request may occur in response to a user interface action but before any request is actually sent via an application. For example, a callback to a browser "submit" action generated in response to a user selecting a button on a Web page may be intercepted and any further actions (e.g., sending of an HTTP GET or POST) are temporarily delayed. The network request includes a location-dependent query containing a location term, and the location term cannot be used by the search engine to positively determine a target location. A location descriptor that can be used by the search engine to positively determine a target location is determined 604 via a location database. The location database may include a location sensor such as GPS. The network request is modified 606 to replace the location term with the location descriptor, and the modified network request is sent 608 to the search engine. The modification 606 of the request may occur before the request is formed. For example, modification of the DOM may occur before the request is generated by the network layer of the browser, and this DOM modification causes a different request to be sent than if the DOM was not modified.

Figure 7:
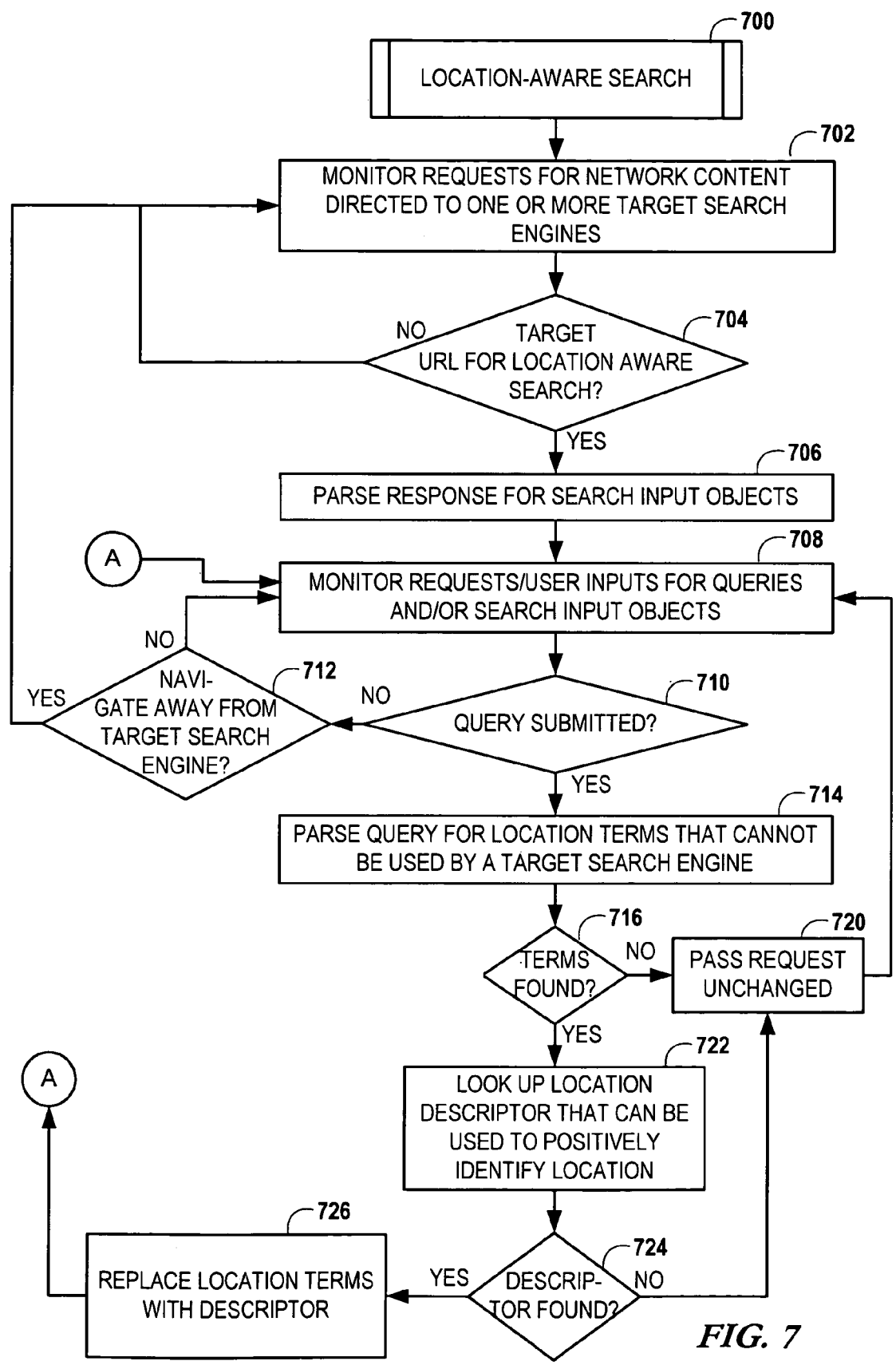
FIG. 7 is a flowchart showing a more particular procedure according to embodiments of the invention.

In reference now to FIG. 7, a flowchart illustrates a more particular procedure 700 for performing location-aware search according to an embodiment of the invention. Requests for network content directed to one or more target search engines is monitored 702. If, at block 704, it is determined that a target URL is directed to a location-aware search engine, the resulting response is parsed 706. The parsing 706 is at least used for finding search input objects (e.g., text input elements, DOM objects) usable for submitting a search query.

The parsed input objects are monitored 708 for purposes of determining 710 whether a query was submitted. If a request was received but was not a query, then it may also be necessary to determine 712 whether the user has navigated away from the search engine. If so, then the monitoring state 702 may be re-entered. If a query has been detected, the query is parsed 714 for location terms that cannot be used by a target search engine to positively identify location (e.g., "nearby," "here," "walking distance from here," etc.). If it is determined 716 that no terms in the query satisfy this criteria, the request is passed unchanged 720, and the monitoring state 708 is re-entered. If terms are found, then they are used to look-up 722 a location descriptor that can be used by the target search engine to positively identify the location. If such a descriptor is found 724, then the location terms are replaced 726 with the descriptor, otherwise the request is passed 720 unchanged.

As will be apparent from reading the above disclosure, embodiments of the invention may be implemented using data processing devices. The functionality of these devices may be realized through the use of instructions that are stored to memory and executed on one or more central processing units. These instructions may be stored and distributed in any form known in the art, including computer readable medium such as magnetic or optical media. The instructions may also be transmitted to the target devices via wired or wireless networks.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. An apparatus comprising:
   at least one processor; and
   at least one memory including computer program code for one or more programs;
   the at least one memory and the computer program code configured to, with the at least one processor, cause, apparatus to perform at least the following,
   determine to intercept a network request targeted for an Internet-based search engine, wherein the network request includes a location-dependent query containing a location term, wherein the location term cannot be used by the search engine to positively determine a target location;
   determine, via a location database of the apparatus, a location descriptor that can be used by the search engine to positively determine the target location;
   cause, at least in part, modification of the network request to replace the location term with the location descriptor; and
   determine to send the modified network request to the search engine.

2. The apparatus of claim 1, wherein the location database comprises a global positioning satellite sensor.

3. The apparatus of claim 1, wherein location descriptor comprises at least one of a street address and a geo-location descriptor.

4. The apparatus of claim 1, wherein the location term comprises a generic term indicating the current location of the apparatus.

5. The apparatus of claim 1, wherein the location term comprises a reference to a dynamically generated navigational route of a navigation application.

6. The apparatus of claim 5, wherein the location descriptor comprises a plurality of location descriptions along the route.

7. The apparatus of claim 5, wherein the apparatus is further caused to:
   determine, via the location database, a current location of the apparatus while the apparatus is traversing the navigational route; and
   cause, at least in part, actions that result in limiting the location descriptor to a region that includes portions of the navigational route not yet traversed.

8. The apparatus of claim 5, wherein the apparatus is further caused to:

repeatedly determine, via the location database, current locations of the apparatus while the apparatus is traversing the route;

determine to form additional network requests based on the modified request and current locations; and determine to send the additional requests to the search engine while the apparatus is traversing the route.

9. The apparatus of claim 1, wherein the location database comprises a proximate mobile device externally coupled to the apparatus.

10. The apparatus of claim 9, wherein determining the location descriptor via the location database of the apparatus comprises accessing a network server that receives location data from the location database and provides the location data in response to network queries.

11. The apparatus of claim 1, wherein the apparatus comprises a mobile Web server that provides the location descriptor in response to a Web service request.

12. The apparatus of claim 1, wherein intercepting the network request and modifying the network request comprises accessing and modifying a document object model of a document via a browser, wherein the browser renders the document and enables user input of the location dependent query via the document.

13. A method comprising:
determining to intercept a network request targeted for an Internet-based search engine, wherein the network request includes a location-dependent query containing a location term, wherein the location term cannot be used by the search engine to positively determine a target location;

determining, via a location database of the apparatus, a location descriptor that can be used by the search engine to positively determine a target location;

causing, at least in part, modification of the network request to replace the location term with the location descriptor;

determining to send the modified network request to the search engine.

14. The method of claim 13, wherein the location database comprises a global positioning satellite sensor.

15. The method of claim 13, wherein the location descriptor comprises at least one of a street address and a geo-location descriptor.

16. The method of claim 13, wherein the location term comprises a generic term indicating the current location of the apparatus.

17. The method of claim 13, wherein the location database comprises a proximate mobile device externally coupled to the apparatus.

18. The method of claim 13, wherein the location term comprises a reference to a dynamically generated navigational route of a navigation application.

19. The method of claim 18, wherein the location descriptor comprises a plurality of location descriptions along the navigational route.

20. The method of claim 18, further comprising:
determining, via the location database, a current location of the apparatus while the apparatus is traversing the navigational route; and limiting the location descriptor to a region that includes portions of the route not yet traversed.

21. The method of claim 18, further comprising:
repeatedly determining, via the location database, current locations of the apparatus while the apparatus is traversing the route; and forming additional network requests based on the modified request and current locations sending the additional requests to the search engine while the apparatus is traversing the route.

22. A computer-readable storage medium including instructions executable by a processor of an apparatus for:
determining to intercept a network request of the apparatus that is targeted for a search engine, wherein the network request includes a location-dependent query containing a location term, wherein the location term cannot be used by the search engine to positively determine a target location;

determining, via a location database of the apparatus, a location descriptor that can be used by the search engine to positively determine the target location;

causing, at least in part, modification of the network request to replace the location term with the location descriptor; and determining to send the modified network request to the search engine.

23. The computer-readable storage medium of claim 22, wherein the location database comprises a proximate mobile device externally coupled to the apparatus.

24. A system comprising:
means for determining to intercept a network request from an apparatus that is targeted for a search engine, wherein the network request includes a location-dependent query containing a location term, wherein the location term cannot be used by the search engine to positively determine a target location;

means for determining, via a location database of the apparatus, a location descriptor that can be used by the search engine to positively determine the target location;

means for causing, at least in part, modification of the network request to replace the location term with the location descriptor; and means for determining to send the modified network request to the search engine.

25. The system of claim 24, wherein the location database comprises a proximate mobile device externally coupled to the apparatus.

* * * * *